(12) United States Patent
Diver

(10) Patent No.: US 12,464,990 B2
(45) Date of Patent: Nov. 11, 2025

(54) STEERABLE MOBILE CART TO DEPOSIT YARD WASTE DIRECTLY FROM A LEAF VACUUM INTO A DISPOSABLE YARD WASTE BAG

(71) Applicant: Daniel S. Diver, Oakville (CA)

(72) Inventor: Daniel S. Diver, Oakville (CA)

( * ) Notice: Subject to any disclaimer, the term of this patent is extended or adjusted under 35 U.S.C. 154(b) by 319 days.

(21) Appl. No.: 17/965,261

(22) Filed: Oct. 13, 2022

(65) Prior Publication Data

US 2024/0122131 A1    Apr. 18, 2024

(51) Int. Cl.
  A01G 20/47    (2018.01)
  B62B 3/00    (2006.01)
  B62B 3/10    (2006.01)

(52) U.S. Cl.
  CPC .............. A01G 20/47 (2018.02); B62B 3/002 (2013.01); B62B 3/106 (2013.01); B62B 2202/50 (2013.01)

(58) Field of Classification Search
  CPC ........ A01G 20/47; A01G 20/43; B62B 3/002; B62B 3/106; B62B 3/12; B65F 1/1415; B65F 1/105; B65F 1/068; B65F 1/1468; B65F 1/06; B65F 1/1473; B65F 1/1431
  See application file for complete search history.

(56) References Cited

U.S. PATENT DOCUMENTS

| | | | |
|---|---|---|---|
| 4,713,858 A | 12/1987 | Kelber | |
| 5,445,398 A | 8/1995 | Pierce | |
| 6,170,118 B1 | 1/2001 | Mcintyre | |
| 6,574,829 B1 | 6/2003 | Marcum | |
| 7,257,858 B2 | 8/2007 | Palazzolo | |
| 7,506,403 B2 | 3/2009 | Svoboda | |
| 7,686,260 B1 | 3/2010 | Tetradis | |
| 7,962,996 B1* | 6/2011 | Mondello | A01G 20/47 15/360 |
| 9,084,393 B1* | 7/2015 | Singleton | A01D 43/0636 |
| 2005/0193517 A1* | 9/2005 | Svoboda | A47L 9/242 15/340.1 |
| 2009/0007367 A1 | 1/2009 | Archbold | |
| 2013/0031740 A1* | 2/2013 | Laliberte | A01G 20/47 15/246.2 |
| 2016/0235011 A1 | 8/2016 | Glisson | |
| 2018/0092498 A1* | 4/2018 | Mata | A47L 9/242 |
| 2020/0247445 A1* | 8/2020 | Daly, Sr. | B62B 3/08 |

FOREIGN PATENT DOCUMENTS

EP    1537773 A1    6/2005
FR    2585337 A1    7/1989

* cited by examiner

*Primary Examiner* — Robert F Neibaur

(74) *Attorney, Agent, or Firm* — HOLBECHE LAW; Kevin Edward Holbeche

(57) ABSTRACT

The Invention is a steerable, mobile wheeled cart made to hold, support and protect a standard 40.6 cmW×30.5 cmD× 89 cmH paper yard waste bag or similar while allowing leaves and debris vacuumed and discharged from a portable leaf blower/vacuum, while in vacuum mode, to pass through a hose and then deposit directly inside of the standard 40.6 cmW×30.5 cmD×89 cmH paper yard waste bag.

17 Claims, 7 Drawing Sheets

STEERABLE MOBILE CART TO DEPOSIT YARD WASTE DIRECTLY FROM A LEAF VACUUM INTO A DISPOSABLE YARD WASTE BAG

BACKGROUND OF THE INVENTION

Leaf and yard waste collection and disposal occur mostly during the fall and again in the spring. Most homeowners and gardening businesses rake or use portable blower/vacuum tools to direct the yard waste as a pile to the curb or to be put into biodegradable yard waste bags. If they blow the yard waste to the curb the wind can often blow debris back onto the yard. Placing the blown yard waste into yard waste bags is better but can be time consuming and dirty work if done by hand. The use of leaf vacuums has made yard clean up easier but it is still messy and time consuming.

In known leaf vacuums, a small debris collection bag is coupled directly to the discharge end of the vacuum. This collection bag typically has a strap or sling to hang the collection bag from the body of the operator. The discharged debris from the leaf vacuum is deposited in the collection bag. When the collection bag is full, the operator unslings the collection bag from the operator's body, disconnects the collection bag from vacuum discharge end, opens a zipper or similar device on the bag, and then empties the debris out of the bag into a paper yard waste bag or similar. This leaf vacuum and bagging system has several significant disadvantages. Most notably, the leaf-collecting bag requires frequent emptying which is time consuming and dirty work. Over time, the leaf vacuum bag become difficult to remove then re-attach during frequent emptying. The vacuum bag also becomes heavy during use and can become tiresome and the frequent emptying can become bothersome. Lastly, the reusable bag eventually wears out and needs to be replaced.

With this in mind, there is a need for a means to deposit leaves and yard waste directly into a disposable yard waste bag while also not being required to carry around said bag.

DESCRIPTION OF PRIOR ART

It is known in prior art that there are devices and carts that have been designed to allow for the deposition of yard waste into bags through tubing attached to the outlet portion of the leaf vacuum device.

There is a cart like U.S Patent Number 20180092498A1 given to Jose Luis Mata on 2018 Sep. 4 that allows for the placement of leaves into a standard 40.6 cmW×30.5 cmD×89 cm H paper yard waste bag or similar but it only supports the yard waste bag by the bottom of the bag by resting on the bottom tier of the cart and is similarly only held in place at the top of the bag with a "shock cord" to a hopper. Having the yard waste bag only connected to the cart at the hopper, as well as, only supported by the cart on the bottom surface of the bag allows for the paper yard bag to be affected by wind and other disturbances common in the fall when leaf collection occurs. This lack of support could result in the loss of attachment to the hopper and a tearing of the paper bag thereby spilling the contents of said bag. The device is also made to carry the leaf vacuum and additional hose length making it bulky and complex. With the addition of four caster wheels and the added bulk the cart would be difficult to steer and control over uneven surfaces.

The present invention allows for the standard 40.6 cmW×30.5 cmD×89 cm H paper yard waste bag, or similar, to be supported: on all four sides of the bag at the bottom of the cart, on both sides of the bag, on the widest and longest portion of the bag by the back of the cart, at the top of the bag using a grip to hold the bag to the back of the cart from the inside of the bag and with a elasticized strap at the top of the cart. The present invention is made to hold the waste bag securely, allow for the cart to be steered and stable over uneven surfaces while also allowing for leaves and debris to be deposited directly into said yard waste bag.

The cart described in U.S. Pat. No. 7,962,996B1 given to Jack Mondello on 2011 Jun. 21 is also designed to hold a leaf vacuum on the cart. The cart holds a trash can attached to the cart which makes the cart complex and bulky. The type of bag it uses must be placed inside the container and the container is not specifically made for current 40.6 cmW×30.5 cmD×89 cmH paper yard waste bags. The cart would require modifications to fit said yard waste bags.

All of the claims listed on the patent described in European Patent Number 1537773A1 by Paul Hunkemöller, support that it was patented as a different type of leaf vacuum. The patent is for a combination leaf vacuum and cart to hold a vessel to contain a disposable leaf bag but not specifically made for the 40.6 cmW×30.5 cmD×89 cmH paper yard waste bag.

The present invention does not claim to be a new type of leaf vacuum and is specifically designed to hold a standard 40.6 cmW×30.5 cmD×89 cm H paper yard waste bag.

The cart described in U.S. Patent Number 750640362 by Steven J. Svoboda, subsequently assigned to The Toro company and granted on 2009 Mar. 24 is made to hold a removable bag that is specifically designed to fit the cart and the cart's air intake flange. This bag must be removed and emptied into a paper yard waste bag much like a larger version of the reusable and removable bag that is attached to current leaf vacuums. The cart can be changed to hold a disposable paper bag but would not use the standard 40.6 cmW×30.5 cmD×89 cmH paper yard waste bag and instead would require a modified paper bag made to fit the cart and its attachments much like a disposable vacuum cleaner bag or it would require the cart to be modified.

U.S. Pat. No. 7,257,858B2 by Palazzolo S. Giacomo in 2007 Aug. 21 used a device that sat in the open end of a paper yard waste bag but required attached legs that sat inside the bag to support the device. The operator had to physically lift and move the bag to desired locations, which is not convenient. The current invention is a mobile and steerable cart that makes depositing leaves and debris directly into a 40.6 cmW×30.5 cmD×89 cm H paper yard waste bag easier and more convenient.

SUMMARY OF THE INVENTION

The invention is a mobile and steerable cart to protectively carry, secure and support a standard 40.6 cmW×30.5 cmD×89 cm H or similar disposable paper yard waste bag by protecting or holding the bag securely at the bottom, back, sides and top of the cart.

Another aspect of the invention is to have leaves and debris discharged from a standard Leaf blower/vacuum through a tube connected to the discharge end of a leaf blower/vacuum by either a universal adapter or an adapter that is brand specific and which is quick-turn connected or similar to the inlet tube on the lid of the cart to then deposit leaves and debris directly into said disposable paper yard waste bag.

Another aspect of this invention is a top lid with dimensions, equal to but slightly less than, the width and length of the disposable 40.6 cmW×30.5 cm D×89 cm H paper yard bag or similar. The lid fits into and is held in place, by swivel or hinge, just inside the top opening of the yard waste bag. An attachment on the bottom of the lid has attached flexible weatherproof material that, while the lid is inside the bag, holds the back of the bag against the back of the cart. A strap additionally secures the bag to the lid and keeps the bag closed around the lid preventing debris from escaping. The lid has an intake tube to receive debris from the leaf blower/vacuum and the hose attached. The lid also has large spaces to allow air to flow out of the bag while keeping debris inside the bag. Screening or similar material is attached to the lid to prevent smaller debris from escaping through the lid.

Another aspect of this invention is the cart is set at an angle such that it decreases the potential for debris to block the attached hose or intake tube while still allowing debris, entering the bag, to fall to the bottom of the bag.

According to the invention, there is disclosed a steerable and mobile, wheeled cart for collecting leaf and yard debris adapted for use with a portable leaf blower/vacuum. The cart is preferably constructed to contain, protect, and hold firmly in place a standard paper yard waste bag. The cart preferably allows for leaves and debris to be directly deposited into the standard paper yard waste bag, from a hose connected to the discharge end of the portable leaf blower/vacuum, while in vacuum mode. The cart preferably includes a chassis that has a rigid frame whereby two wheels that, preferably fixed to rotate in a directional movement of forward and backward, are preferably attached on distal ends of a transverse axle located on a back end of said chassis. One or more castor wheels are preferably located on a front end of the chassis and allow the chassis to be steer controlled. A guide wire is preferably connected to the front end of the chassis and to a distal end of the hose. The chassis is preferably connected to the cart to allow the cart to be moved, steered, and to follow the operator by directional tension applied to the hose connected to the cart, or by directional tension applied to the guide wire. The cart preferably has an upwardly turned flat bottom that is rectangle in overall shape with either square or rounded corners. At least two sides of the flat bottom are preferably raised higher than the flat bottom to form an enclosed or partially enclosed space. The flat bottom with raised sides is preferably made to fit, securely hold, protect, and support the bottom of the standard paper yard waste bag. The cart preferably has a flat back that is sized to hold the standard paper yard waste bag and is preferably maintained at an angle to the ground with a top higher than a bottom. The back of the cart is preferably set at an angle to securely hold, support, and protect the longest and widest part of the standard paper yard waste bag. The cart also preferably includes a rigid lid, which is preferably attached to the cart by a swivel or hinge. The lid is preferably similar in shape to the top opening of the standard paper yard waste bag but is preferably less in length and width measurements to the top opening of said bag. The lid preferably has a top and bottom flat surface and four sides that form a rectangular shape. There are preferably large openings or holes that allow air to flow through the lid. The lid preferably has screen material attached to the top, the bottom, or both the top and bottom surface. Preferably attached to an underside of the lid, along a longer side of the lid and proximal to the cart, is a panel or rod(s). The panel or rod(s) preferably hang lower than the lid. Preferably attached to the panel or rod(s) is flexible weather-resistant material. Preferably built as part of the lid or attached to the lid is an inlet tube. The inlet tube preferably passes from the top of the lid through to the underside of the lid providing an opening through the lid. The top portion of the inlet tube is preferably set at an angle to the lid but becomes perpendicular to the lid prior to contacting the top of the lid and preferably remains perpendicular to the lid after passing through the lid. The top of the inlet tube preferably has a connection means for connecting the hose. The hose preferably connects proximally to the inlet tube via the connection means, and distally to the discharge end of the portable leaf blower/vacuum via a universal adapter or a leaf blower/vacuum brand specific adapter. The cart preferably also includes elasticised straps at the side of the cart near the top end of the cart. The elasticised straps preferably wrap and hold the opening of the standard paper yard waste bag securely and tightly around the lid.

According to an aspect of the invention, three sides of the flat bottom may preferably, but need not necessarily, be raised higher than the flat bottom to form the enclosed or partially enclosed space.

According to an aspect of the invention, the elasticised straps may preferably, but need not necessarily, use a clasp and/or hook-and-loop fastening materials (such as, for example, materials offered under the VELCRO trademark by the Velcro Companies of Manchester, New Hampshire) to wrap and/or hold the opening of the standard paper yard waste bag securely and/or tightly around the lid.

According to the invention, there is also disclosed a steerable and mobile, wheeled cart for collecting leaf and yard debris adapted for use with a portable leaf blower/vacuum. The cart is preferably constructed to contain, protect, and hold firmly in place a standard paper yard waste bag. The cart preferably allows for leaves and debris to be directly deposited into the standard paper yard waste bag from a hose connected to the discharge end of the portable leaf blower/vacuum, while in vacuum mode. The cart preferably includes a chassis that has a rigid frame with at least two wheels for directional movement of the chassis forward and backward, and to allow the chassis to be steer controlled. The chassis is preferably connected to the cart to allow the cart to be moved, steered, and to follow the operator. The cart preferably has a substantially flat bottom that is preferably made to fit, securely hold, protect, and support a bottom of the standard paper yard waste bag. The cart preferably has a flat back that preferably is sized to hold the standard paper yard waste bag and is maintained at an angle to the ground with a top higher than a bottom. The back of the cart is preferably set at an angle to securely hold and support the standard paper yard waste bag. A rigid lid is preferably attached to the cart, and is preferably substantially similar in shape and size to a top opening of the standard paper yard waste bag. The lid preferably has a top flat surface and a bottom flat surface, with openings or holes therethrough that allow air to flow through the lid. Preferably built as part of the lid or attached to the lid is an inlet tube. The inlet tube preferably passes from the top of the lid through to the underside of the lid providing an opening through the lid. The top of the inlet tube preferably has a connection means for connecting the hose. The hose preferably connects proximally to the inlet tube via the connection means, and distally to the discharge end of the portable leaf blower/vacuum. Elasticised straps are preferably provided at the side of the cart near the top end of the cart. The elasticised straps preferably wrap and hold the opening of the standard paper yard waste bag securely and tightly around the lid.

According to an aspect of the invention, the aforesaid at least two wheels of the rigid frame may preferably, but need not necessarily, include: two wheels that may preferably, but need not necessarily, be fixed to rotate in a directional movement of forward and/or backward, and/or are attached on distal ends of a transverse axle located on a back end of said chassis; and/or one or more castor wheels located on a front end of the chassis that may preferably, but need not necessarily, allow the chassis to be steer controlled.

According to an aspect of the invention, a guide wire may preferably, but need not necessarily, be connected to the front end of the chassis and/or to a distal end of the hose. Directional tension applied to the guide wire, and/or to the hose connected to the cart via the inlet tube, may preferably, but need not necessarily, allow the cart to be moved, steered, and/or to follow the operator as aforesaid.

According to an aspect of the invention, the substantially flat bottom of the cart may preferably, but need not necessarily, be rectangle in overall shape with square and/or rounded corners, and/or may preferably, but need not necessarily, be upwardly turned with at least two sides of the flat bottom being raised higher than the flat bottom to form an at least partially enclosed space. The raised sides may preferably, but need not necessarily, be made to fit, securely hold, protect, and/or support the bottom of the standard paper yard waste bag as aforesaid.

According to an aspect of the invention, three sides of the flat bottom may preferably, but need not necessarily, be raised higher than the flat bottom to form the aforesaid at least partially enclosed space.

According to an aspect of the invention, the back of the cart may preferably, but need not necessarily, securely hold, support, and/or protect the longest and/or widest part of the standard paper yard waste bag.

According to an aspect of the invention, a swivel and/or hinge may preferably, but need not necessarily, attach the lid to the cart as aforesaid. The lid may preferably, but need not necessarily, be substantially similar in size as aforesaid, but less in length and/or width measurements, to the top opening of the bag. The lid may preferably, but need not necessarily, have four sides that form a rectangular shape. The lid may preferably, but need not necessarily, have screen material attached to the top flat surface, the bottom flat surface, or both the top flat surface and the bottom flat surface.

According to an aspect of the invention, a panel and/or rod(s) may preferably, but need not necessarily, be attached to an underside of the lid proximal to the cart, and/or hang lower than the lid. Flexible weather-resistant material may preferably, but need not necessarily, be attached to the panel and/or rod(s).

According to an aspect of the invention, a top portion of the inlet tube may preferably, but need not necessarily, be set at an angle to the lid but become perpendicular to the lid prior to contacting the top flat surface of the lid, and/or remain perpendicular to the lid after passing through the lid.

According to an aspect of the invention, the connection means may preferably, but need not necessarily, include a quick-turn connection.

According to an aspect of the invention, the hose may preferably, but need not necessarily, be connected distally to the discharge end of the portable leaf blower/vacuum via a universal adapter and/or a leaf blower/vacuum brand specific adapter.

According to an aspect of the invention, the elasticised straps use a clasp to wrap and/or hold the opening of the standard paper yard waste bag securely and/or tightly around the lid.

According to an aspect of the invention, the cart may preferably, but need not necessarily, be adapted for use with the standard paper yard waste bag having dimensions of substantially about 40.6 cmW×30.5 cmD×89 cm H.

BRIEF DESCRIPTION OF DRAWINGS

FIG. 1a is a perspective view of a wheeled mobile cart that is made to carry a standard 40.6 cmW×30.5 cmD×89 cmH paper yard waste bag or similar. Not shown in this drawing is the hose that connects to the discharge end of a leaf blower/vacuum distally and to the cart inlet tube proximally, this hose will be shown in FIG. 2a.

DETAILED DESCRIPTION OF THE INVENTION

Figure 2A:
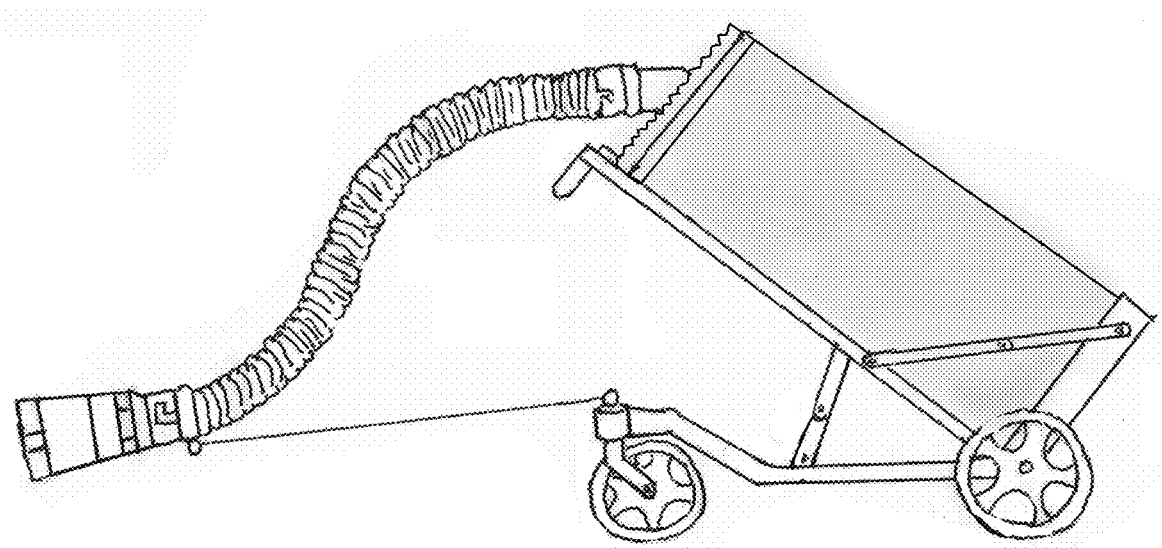
FIG. 2a is a side view of the cart showing the position of the standard 40.6 cmW×30.5 cmD×89 cmH paper yard waste bag or similar as it is held in place on the cart. This diagram also shows the hose that attaches distally to the discharge end of a standard leaf blower/vacuum and proximally to the inlet tube on the lid of the cart.
Figure 2B:
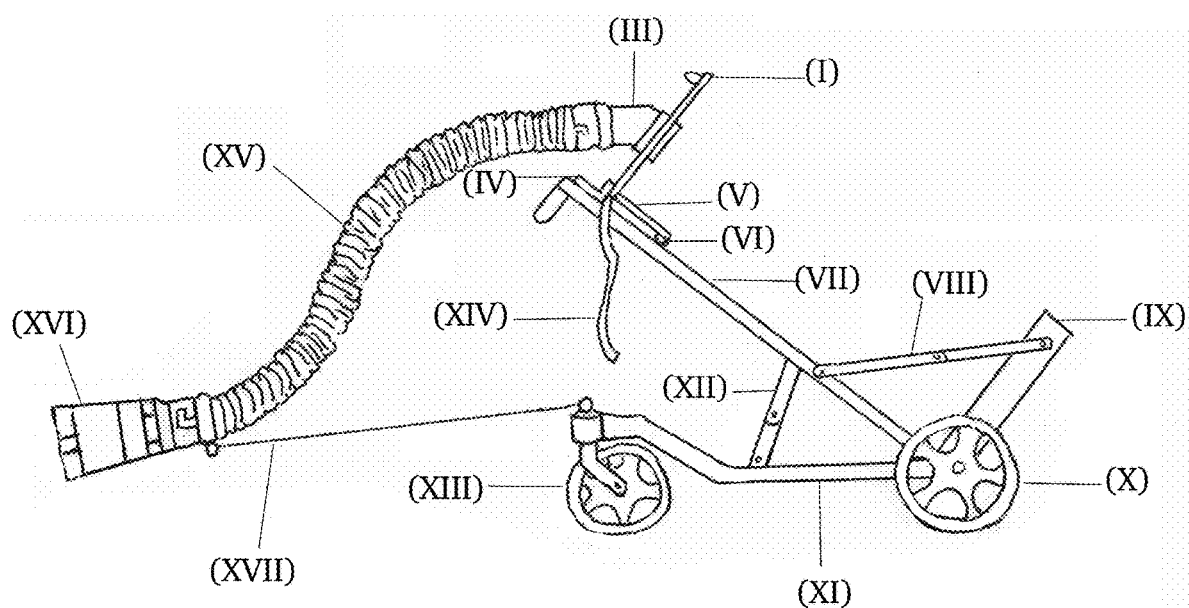
FIG. 2b is a side view of the cart with numerically labeled elements of the cart. Each reference numeral refers to like elements throughout the drawings.

This invention as shown in FIG. 2a is of a leaf and yard debris collection system for use with a portable, hand held, leaf blower/vacuum while in vacuum mode. The invention is made to transport and deposit leaves and yard debris directly from the leaf vacuum into a standard 40.6 cmW×30.5 cmD×89 cmH paper yard waste bag or similar. The leaf and debris collection system comprises a directionally mobile, wheeled cart that is constructed to: contain, protect and hold firmly in place said paper yard waste bag. A hose XV FIG. 2b is connected to the discharge end of said portable leaf blower/vacuum via a universal or brand-specific adapter XVI FIG. 2b and is also connected to an inlet tube III located on the top lid I of said cart. From the hose XV FIG. 2b, discharged air as well as leaves and yard debris flow through the inlet tube III and directly into a standard 40.6 cmW×30.5 cmD×89 cmH paper yard waste bag or similar. The leaves and debris, having been deposited into said yard waste bag, leave just the discharged air to circulate and to escape out of said yard waste bag through the top lid I of the cart.

Figure 1A:
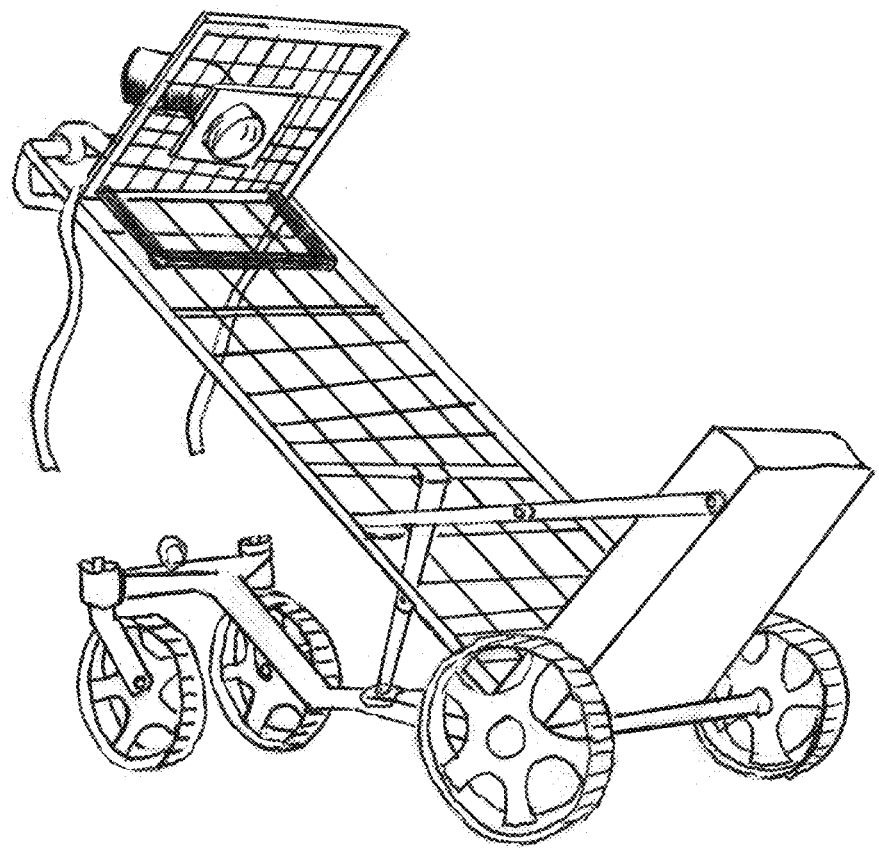
Figure 1B:
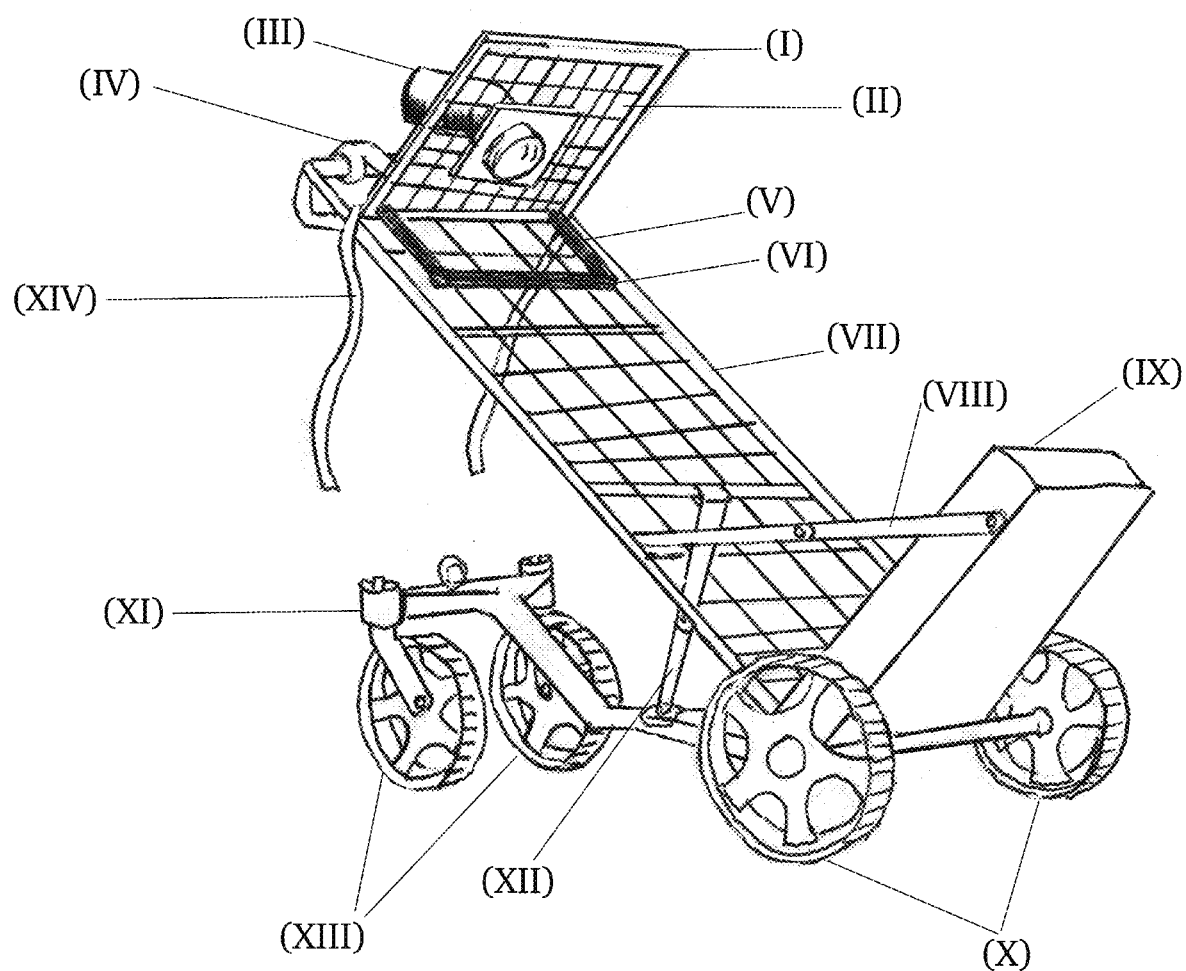
FIG. 1b is a perspective view of said cart with numerically labeled elements of the cart to be described, in greater detail, in the description of the invention. Each reference numeral refers to like elements throughout the drawings.

The directionally mobile, wheeled cart FIG. 1b is comprised of tubular metal and rigid metal wire or rods or of any material of similar rigidity. The cart can also utilize the use of one or more flat surfaced material where flat surfaces are desired. The cart is comprised of an upwardly turned flat bottom IX with two or more raised sides, a back VII which is longer in height than in width and a swivel or hinge IV attached lid I which is lowered into the top opening of said paper yard waste bag. A chassis XI for the cart is comprised of a frame whereby two wheels X which, fixed in a directional movement of forward and backward, are attached on the distal ends of a transverse axle located on the back end of said chassis.

One or more castor wheels XIII are located on the front end of said chassis. The chassis is attached to the cart at one or more points where the back VII of the cart joins the bottom IX of the cart. Two lengths of metal or other rigid material create an "arm" XII. The lengths of metal joined at a hinged end allow for the lengths of metal to be folded together. The lengths of hinged material or "arm" VIII is hinge attached at one end to the back VII of the cart and also hinged attached at the opposite end to the wheeled chassis XI. The "arm" XII maintains the cart at an angle where the front end of the cart is higher than the back end of the cart. Having a foldable "arm" allows the wheeled chassis XI to be folded against the back VII of the cart for easier storage. The "arm" can also be constructed of a single length of rigid material but will be unable to be folded.

As perhaps best seen in FIG. 2b, a guide wire XVII is preferably connected to the front end of the chassis XI and to a distal end of the hose XV.

The upwardly turned flat bottom IX of the cart is rectangle in overall shape with either square or rounded corners. At least two but preferably three sides of the flat bottom IX are raised higher than the flat bottom IX to form an enclosed or partially enclosed space. The flat bottom IX with raised sides is made to fit, securely hold and support the bottom of a standard 40.6 cmW×30.5 cmD×89 cm H paper yard waste bag or similar. Two lengths of metal or other rigid material are hinged together to form a foldable "arm" VIII. One foldable "arm" VIII is attached, at one end, by rivet or similar to the right side of the flat bottom IX of the cart. Attaching the "arm" by a rivet allows the arm VIII to swivel freely around the rivet. Similarly, the opposite end of said foldable arm VIII is attached to, the lateral aspect of and the right side of, the back VII of the cart by rivet or similar device. This process for attaching a foldable "arm" VIII is repeated for the left side of the cart.

These bilateral foldable "arms" VIII allow the distal end of the flat bottom IX to be moved and positioned towards the back VII of the cart allowing compaction of the cart for easier storage. The foldable "arm" VIII one each located on either side of the cart are also made to support, contain and protect the narrow sides of a standard 40.6 cmW×30.5 cmD×89 cm H paper yard waste bag or similar when the bag is installed onto the cart as in FIG. 2a.

The back VII of the cart in FIG. 1b is a flat area which is longer than it is wide and made to support and protect the longest and widest part of a standard 40.6 cmW×30.5 cmD×89 cmH paper yard waste bag or similar. The back VII of the cart is maintained at an angled position to the ground, during operation, by the attached "arm" XII where the top end of the cart is higher than the bottom end. This allows for the widest and longest part of said bag to be supported and protected during use. The back VII of the cart also supports the weight of leaves and debris vacuumed by the leaf blower/vacuum and deposited into the opening of said bag. Having the cart maintained at an angled position allows the weight of the leaves and debris, as well as the bag, to be supported along the longest and widest part of said bag by the back VII of the cart while still allowing the debris to fall and collect at the bottom of the bag.

The top of the cart in FIG. 1b has a lid I which is attached to the cart by a swivel or hinge IV. The lid I is similar is shape to the top opening of a standard 40.6 cmW×30.5 cmD×89 cmH paper yard waste bag or similar but is slightly less in length and width measurement to the top opening of said bag. This allows for the lid I to be lowered into and to be positioned, just inside of, the top opening of said bag.

The lid I consists of a flat and rigid material with four sides and multiple openings or empty spaces throughout the top and bottom surfaces such as a grill or similar. Attached to and creating a passage through the lid I is an inlet tube III. The top portion of the inlet tube III is set at an angle to the lid I but becomes perpendicular to the lid I prior to attaching to and passing through the lid I. The top portion of the inlet tube III is angled to prevent the hose XV FIG. 2b from excessively curving during use thereby preventing a potential area of obstruction on said hose. On the top of the lid I the inlet tube III has a quick-turn connect, or similar, adaptor to attach proximally to the hose XV FIG. 2b. The distal end of the hose XV FIG. 2b has a universal adapter or leaf blower/vac product-specific adapter XVI FIG. 2b that connects the distal end of said hose XV FIG. 2b to the discharge end of a portable leaf blower/vacuum.

Figure 3:
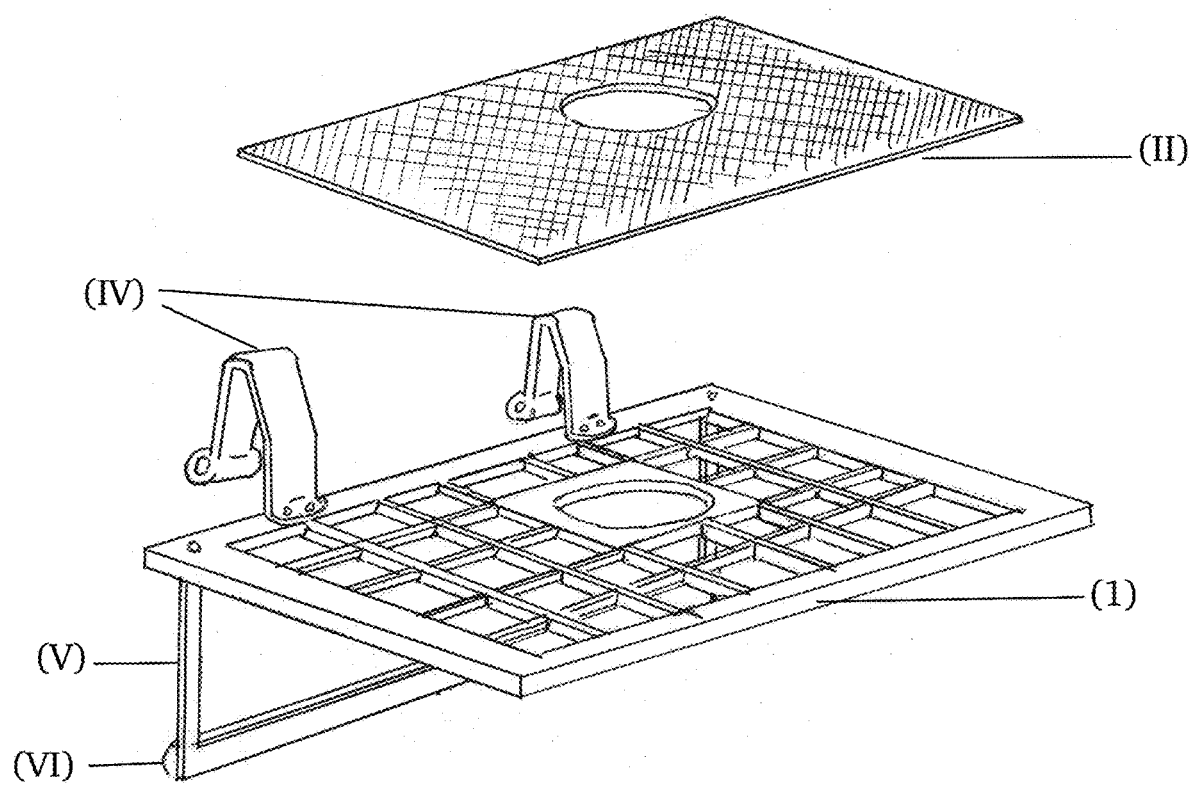
FIG. 3 is a, numerically labeled, perspective view of the swivel or hinged lid that is lowered into the top opening of the standard 40.6 cmW×30.5 cmD×89 cm H paper yard waste bag or similar. Not shown is the inlet tube that enters the lid.
Figure 4:
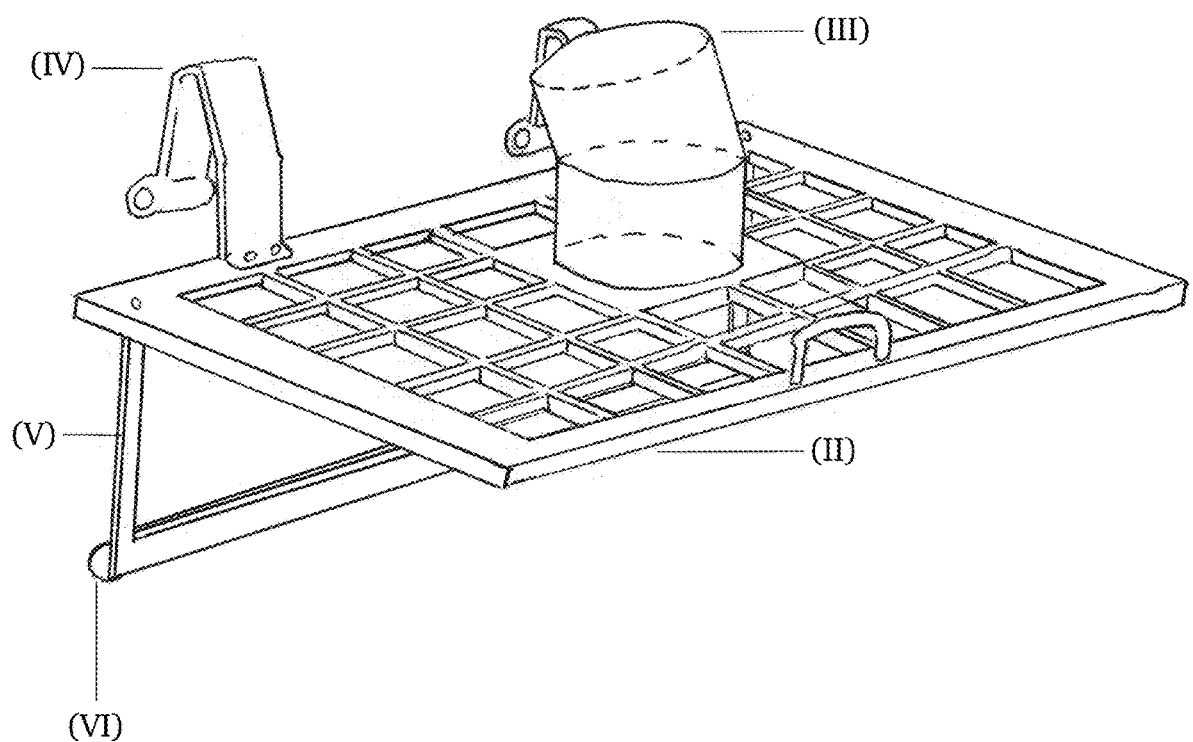
FIG. 4 is a numerically labeled perspective view of the swivel or hinged lid shown in FIG. 3.
Figure 5:
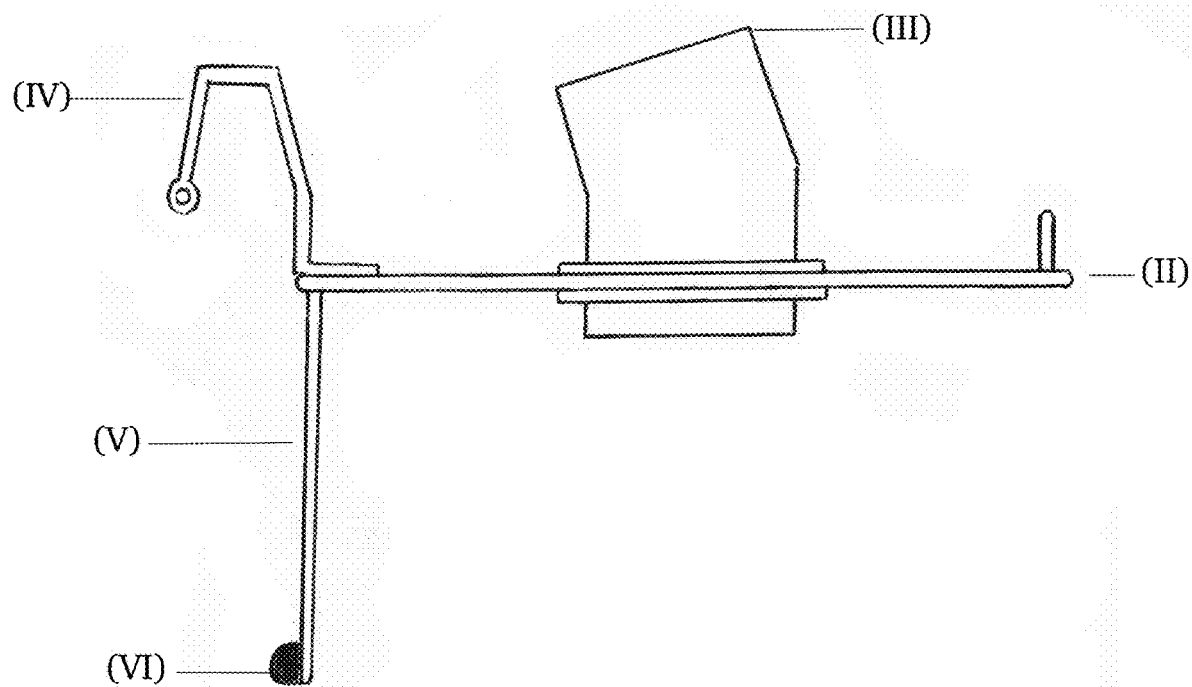
FIG. 5 is a numerically labeled side view of FIG. 4.

During operation of the portable leaf blower/vacuum all discharged leaves, debris and airflow enter the universal adapter or product-specific adapter XVI FIG. 2b. The discharged leaves, debris and airflow: pass through the hose XV FIG. 2b, into the inlet tube III FIG. 2b and through the lid I where the leaves and debris are deposited into a standard 40.6 cmW×30.5 cmD×89 cmH paper yard waste bag or similar. Upon entering said bag, the airflow creates a positive air pressure that helps maintain said bag fully expanded and prevents collapse of said bag. The air pressure from the discharged high airflow is then allowed to escape from said bag by passing through the large openings in the lid I. The openings in the lid I are large enough to allow for the passage of the airflow but are not large enough to allow any large leaves or debris from ejecting out of the standard 40.6 cmW×30.5 cmD×89 cmH paper yard waste bag or similar. To limit the amount of small debris material from being blown out of the bag through the lid I a screen material II FIG. 3 is attached to the lid I.

Attached to the underside of the lid I along the longer side and proximal to the cart is a panel or rod V made of rigid material. Attached to the panel or rod V is a flexible weather-resistant material VI. When the lid I is lowered, via the swivel or hinge IV, into the opening of a standard 40.6 cmW×30.5 cmD×89 cmH paper yard waste bag or similar, the panel or rod V and the flexible weather-resistant material VI apply pressure to the inside of said bag against the back VII of the cart. This applied pressure to said bag from the inside helps to secure said bag to the cart at the top end of said bag. An elasticized strap XIV located and attached to the top of the cart on either side is then used to secure the top of the bag to the lid I. The elasticized strap helps to secure the opening of the standard 40.6 cmW×30.5 cmD×89 cmH paper yard waste bag or similar to the lid I.

The elasticized strap XIV is the last in a series of devices that allows for a standard 40.6 cmW×30.5 cmD×89 cmH paper yard waste bag or similar to be secured, protected and supported at the bottom, sides, back and top surfaces of said bag during operation of the invention.

The invention claimed is:

1. A steerable and mobile, wheeled cart for collecting leaf and yard debris adapted for use with a portable leaf blower/vacuum that is constructed to: contain a standard paper yard waste bag; the cart allows for leaves and debris to be directly deposited into said standard paper yard waste bag from a hose connected to a discharge end of the portable leaf blower/vacuum, while in vacuum mode, which comprises:

a) a chassis comprised of a frame whereby two wheels that, fixed to rotate in a directional movement of forward and backward, are attached on distal ends of a transverse axle located on a back end of said chassis; one or more castor wheels located on a front end of said chassis which allow the chassis to be steer controlled;

b) a guide wire is connected to the front end of the chassis and a distal end of the hose; the chassis is connected to the cart to allow the cart to be moved, steered and to follow an operator by directional tension applied to the hose connected to the cart or by directional tension applied to the guide wire;

c) the cart has a flat bottom oriented at an upwardly turned angle and the flat bottom is rectangular in shape with either square or rounded corners; at least two sides of the flat bottom are raised higher than the flat bottom to form an enclosed or partially enclosed space; the flat bottom with raised sides is made to fit, securely hold, protect and support the bottom of the standard paper yard waste bag;

d) the cart has a flat back that is sized to hold the standard paper yard waste bag and is maintained at a second angle to the ground with a top higher than a bottom and is further at a 90 degree angle with respect to the flat bottom of the cart; the back of the cart is set at an angle to securely hold, support and protect the longest and widest part of the standard paper yard waste bag;

e) a lid, which is attached to the cart by a swivel or hinge, is substantially the same in shape to a top opening of the standard paper yard waste bag but is less in length and width measurements to the top opening of said bag;

f) the lid has a top and bottom flat surface and four sides that form a rectangular shape; and openings or holes that allow air to flow through the lid;

g) the lid has screen material attached to the top, the bottom or both the top and bottom surface;

h) built as part of the lid or attached to the lid is an inlet tube; the inlet tube passes from the top of the lid through to the underside of the lid providing an opening through the lid; the inlet tube has a top portion which is set at an angle to the lid but becomes perpendicular to the lid prior to contacting the top of the lid and remains perpendicular to the lid after passing through the lid;

i) the top of the inlet tube has a connection means for connecting the hose;

j) the hose connects proximally to the inlet tube via the connection means and distally to the discharge end of the portable leaf blower/vacuum via a universal adapter or a leaf blower/vacuum brand specific adapter; and k) a side portion, a top end portion, and straps at the side portion of the cart adjacent to the top end portion of the cart, wherein the straps wrap and hold the opening of the standard paper yard waste bag around the lid.

2. The cart according to claim 1, wherein three sides of the flat bottom are raised higher than the flat bottom to form the enclosed or partially enclosed space.

3. The cart according to claim 2, wherein the connection means comprises a quick-turn connection.

4. The cart according to claim 3, further comprising a clasp; wherein the straps use the clasp to wrap and hold the opening of the standard paper yard waste bag around the lid.

5. A steerable and mobile, wheeled cart for collecting leaf and yard debris adapted for use with a portable leaf blower/vacuum that is constructed to: contain a standard paper yard waste bag; the cart allows for leaves and debris to be directly deposited into said standard paper yard waste bag from a hose connected to a discharge end of the portable leaf blower/vacuum, while in vacuum mode; wherein the cart comprises:

a) a chassis comprising a frame with at least two wheels for directional movement of the chassis forward and backward which allow the chassis to be steer controlled; the chassis is connected to the cart to allow the cart to be moved, steered and to follow an operator;

b) the cart has a substantially flat bottom that is made to fit, hold, and support a bottom of the standard paper yard waste bag;

c) the cart has a flat back that is sized to hold the standard paper yard waste bag and is maintained at a second angle to the ground with a top higher than a bottom and is further at a 90 degree angle with respect to the flat bottom of the cart; the back of the cart is set at an angle to securely hold and support the standard paper yard waste bag;

d) a lid, which is attached to the cart, is substantially the same in shape and size to a top opening of the standard paper yard waste bag; the lid has a top flat surface and a bottom flat surface, with openings or holes therethrough that allow air to flow through the lid; built as part of the lid or attached to the lid is an inlet tube; the inlet tube passes from the top of the lid through to the underside of the lid providing an opening through the lid; the top of the inlet tube has a connection means for connecting the hose;

e) the hose connects proximally to the inlet tube via the connection means and distally to the discharge end of the portable leaf blower/vacuum; and f) a side portion, a top end portion, and elasticised straps; at the side portion of the cart adjacent to the top end portion of the cart, wherein the elasticised straps wrap and hold the opening of the standard paper yard waste bag around the lid.

6. The cart according to claim 5, wherein said at least two wheels of the rigid frame comprise: two wheels that are fixed to rotate in a directional movement of forward and backward, and are attached on distal ends of a transverse axle located on a back end of said chassis; and one or more castor wheels located on a front end of said chassis which allow the chassis to be steer controlled.

7. The cart according to claim 6, further comprising a guide wire that is connected to the front end of the chassis and a distal end of the hose; wherein directional tension applied to the guide wire, or to the hose connected to the cart via the inlet tube, allows the cart to be moved, steered and to follow the operator as aforesaid.

8. The cart according to claim 7, wherein the substantially flat bottom of the cart is substantially rectangular with either square or rounded corners, and is upwardly turned with at least two sides of the flat bottom being raised higher than the flat bottom to form an at least partially enclosed space; and wherein the raised sides are made to fit, hold, and support the bottom of the standard paper yard waste bag as aforesaid.

9. The cart according to claim 8, wherein three sides of the flat bottom are raised higher than the flat bottom to form said at least partially enclosed space.

10. The cart according to claim 9, wherein the back of the cart holds and supports the longest and widest parts of the standard paper yard waste bag.

11. The cart according to claim 10, further comprising a swivel or hinge that attaches the lid to the cart as aforesaid; wherein the lid is substantially similar in size as aforesaid, but is less in length and width measurements, to the top opening of said bag; wherein the lid has four sides that form a rectangular shape; and wherein the lid has screen material attached to the top flat surface, the bottom flat surface, or both the top flat surface and the bottom flat surface.

12. The cart according to claim 11, further comprising one or more rods that are attached to an underside of the lid proximal to the cart, and hang lower than the lid.

13. The cart according to claim 11, wherein a top portion of the inlet tube is set at an angle to the lid but becomes perpendicular to the lid prior to contacting the top flat surface of the lid and remains perpendicular to the lid after passing through the lid.

14. The cart according to claim 13, wherein the connection means comprises a quick-turn connection.

15. A cart according to claim 14, wherein the hose is connected distally to the discharge end of the portable leaf blower/vacuum via an adapter.

16. The cart according to claim 15, further comprising a clasp; wherein the straps use the clasp to wrap and hold the opening of the standard paper yard waste bag around the lid.

17. The cart according to claim 16, wherein the cart is adapted for use with the standard paper yard waste bag having dimensions of substantially about 40.6 cmW×30.5 cmD×89 cmH.

* * * * *